US008374730B2

(12) United States Patent
Conroy et al.

(10) Patent No.: US 8,374,730 B2
(45) Date of Patent: Feb. 12, 2013

(54) METHODS AND APPARATUSES FOR DYNAMIC THERMAL CONTROL

(75) Inventors: David G. Conroy, El Granada, CA (US); Keith Alan Cox, Campbell, CA (US); Michael Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 1162 days.

(21) Appl. No.: 11/212,983

(22) Filed: Aug. 25, 2005

(65) Prior Publication Data
US 2007/0067136 A1    Mar. 22, 2007

(51) Int. Cl.
*G05D 23/00* (2006.01)
(52) U.S. Cl. .................. 700/299; 361/679.02; 361/688; 702/130; 713/300; 713/340
(58) Field of Classification Search .......... 700/275–278, 700/291, 295, 299; 713/300, 320, 322, 340; 374/100, 102; 702/130; 361/679.01, 679.02, 361/688
See application file for complete search history.

(56) References Cited

U.S. PATENT DOCUMENTS

| 5,167,024 A | 11/1992 | Smith et al. |
| 5,520,153 A | 5/1996 | Milunas |
| 5,532,935 A | 7/1996 | Ninomiya et al. |
| 5,532,945 A | 7/1996 | Robinson |
| 5,560,022 A | 9/1996 | Dunstan et al. |
| 5,627,412 A | 5/1997 | Beard |
| 5,812,860 A | 9/1998 | Horden |
| 5,825,674 A | 10/1998 | Jackson |
| 5,842,027 A | 11/1998 | Oprescu et al. |
| 5,915,838 A * | 6/1999 | Stals et al. .................. 374/45 |
| 5,963,424 A | 10/1999 | Hileman et al. |
| 5,964,879 A | 10/1999 | Dunstan et al. |
| 6,122,758 A | 9/2000 | Johnson et al. |

(Continued)

FOREIGN PATENT DOCUMENTS

| EP | 0632 360 A1 | 1/1995 |
| GB | 2405236 A | 2/2005 |

(Continued)

OTHER PUBLICATIONS

PCT Search Report and Written Opinion for PCT/US2006/029244, mailed Sep. 17, 2007, 22 pages.

(Continued)

*Primary Examiner* — Mohammad Ali
*Assistant Examiner* — Sheela S Rao
(74) *Attorney, Agent, or Firm* — Blakely, Sokoloff, Taylor & Zafman LLP

(57) ABSTRACT

Methods and apparatuses for dynamically budgeting power usage to control temperatures in a data processing system. In one aspect, a data processing system includes: a first sensor to determine an ambient temperature of an environment in which the data processing system is; and a controller (e.g., a microcontroller or a microprocessor) coupled to the sensor to control operations of the data processing system according to the ambient temperature. In one example, the data processing system further includes a second sensor to determine an actual temperature of a component of the data processing system. In one example, a controller is coupled to the temperature sensors to determine an operating setting of the data processing system based on a prediction of a temperature of the data processing system which is a function of the plurality of actual temperatures and the operating setting of the data processing system.

57 Claims, 10 Drawing Sheets

U.S. PATENT DOCUMENTS

| | | | |
|---|---|---|---|
| 6,134,667 A | 10/2000 | Suzuki et al. | |
| 6,270,252 B1 * | 8/2001 | Siefert | 374/102 |
| 6,415,388 B1 | 7/2002 | Browning et al. | |
| 6,477,156 B1 | 11/2002 | Ala-Laurila et al. | |
| 6,594,771 B1 | 7/2003 | Koerber et al. | |
| 6,718,474 B1 | 4/2004 | Somers et al. | |
| 6,745,117 B1 | 6/2004 | Thacher et al. | |
| 6,888,332 B2 | 5/2005 | Matsushita | |
| 6,925,573 B2 | 8/2005 | Bodas | |
| 6,952,782 B2 | 10/2005 | Staiger | |
| 6,986,069 B2 | 1/2006 | Oehler et al. | |
| 7,036,027 B2 | 4/2006 | Kim et al. | |
| 7,111,178 B2 * | 9/2006 | Rusu et al. | 713/300 |
| 7,134,029 B2 | 11/2006 | Hepner et al. | |
| 7,139,920 B2 | 11/2006 | Williams | |
| 7,162,651 B2 | 1/2007 | Brockhaus | |
| 7,171,570 B2 | 1/2007 | Cox et al. | |
| 7,177,728 B2 | 2/2007 | Gardner | |
| 7,178,043 B2 | 2/2007 | Nakazato | |
| 7,194,646 B1 * | 3/2007 | Watts, Jr. | 713/322 |
| 7,228,448 B2 | 6/2007 | Anderson et al. | |
| 7,272,732 B2 | 9/2007 | Farkas et al. | |
| 7,295,949 B2 | 11/2007 | Vorenkamp et al. | |
| 7,353,133 B2 * | 4/2008 | Park | 702/130 |
| 7,383,451 B2 | 6/2008 | Matsushima et al. | |
| 7,421,598 B2 | 9/2008 | Brittain et al. | |
| 7,421,601 B2 | 9/2008 | Bose et al. | |
| 7,451,332 B2 | 11/2008 | Culbert et al. | |
| 7,562,234 B2 | 7/2009 | Conroy et al. | |
| 7,640,760 B2 * | 1/2010 | Bash et al. | 62/178 |
| 7,788,516 B2 | 8/2010 | Conroy et al. | |
| 7,802,120 B2 | 9/2010 | Conroy et al. | |
| 2001/0021217 A1 | 9/2001 | Gunther et al. | |
| 2002/0007463 A1 | 1/2002 | Fung | |
| 2002/0020755 A1 | 2/2002 | Matsushita | |
| 2002/0065049 A1 | 5/2002 | Chauvel et al. | |
| 2002/0083354 A1 | 6/2002 | Adachi | |
| 2002/0099962 A1 | 7/2002 | Nakamura | |
| 2002/0143488 A1 | 10/2002 | Cooper et al. | |
| 2002/0149911 A1 * | 10/2002 | Bishop et al. | 361/690 |
| 2002/0194509 A1 | 12/2002 | Plante et al. | |
| 2003/0053293 A1 | 3/2003 | Beitelmal et al. | |
| 2003/0126475 A1 | 7/2003 | Bodas | |
| 2003/0188210 A1 | 10/2003 | Nakazato | |
| 2004/0003301 A1 | 1/2004 | Nguyen | |
| 2004/0003303 A1 | 1/2004 | Oehler et al. | |
| 2004/0044914 A1 | 3/2004 | Gedeon | |
| 2004/0064745 A1 | 4/2004 | Kadambi | |
| 2004/0088590 A1 | 5/2004 | Lee et al. | |
| 2004/0117680 A1 | 6/2004 | Naffziger | |
| 2004/0133816 A1 | 7/2004 | Miyairi | |
| 2004/0148528 A1 | 7/2004 | Silvester | |
| 2004/0159240 A1 * | 8/2004 | Lyall, III | 99/275 |
| 2004/0163001 A1 | 8/2004 | Bodas | |
| 2004/0181698 A1 | 9/2004 | Williams | |
| 2004/0210787 A1 | 10/2004 | Cox et al. | |
| 2005/0015764 A1 | 1/2005 | Gaur | |
| 2005/0055590 A1 | 3/2005 | Farkas et al. | |
| 2005/0102539 A1 | 5/2005 | Hepner et al. | |
| 2005/0132371 A1 | 6/2005 | Lopez-Estrada | |
| 2005/0136989 A1 | 6/2005 | Dove | |
| 2005/0138440 A1 | 6/2005 | Barr et al. | |
| 2005/0143865 A1 | 6/2005 | Gardner | |
| 2005/0149540 A1 | 7/2005 | Chan et al. | |
| 2005/0182986 A1 | 8/2005 | Anderson et al. | |
| 2005/0210304 A1 | 9/2005 | Hartung et al. | |
| 2005/0240786 A1 | 10/2005 | Ranganathan | |
| 2005/0278556 A1 | 12/2005 | Smith et al. | |
| 2005/0283683 A1 | 12/2005 | Abedi et al. | |
| 2006/0005057 A1 | 1/2006 | Nalawadi et al. | |
| 2006/0036878 A1 | 2/2006 | Rothman et al. | |
| 2006/0047983 A1 | 3/2006 | Aleyraz et al. | |
| 2006/0098463 A1 | 5/2006 | Baurle et al. | |
| 2006/0168456 A1 | 7/2006 | Chaudhry et al. | |
| 2006/0190745 A1 | 8/2006 | Matsushima et al. | |
| 2006/0190749 A1 | 8/2006 | He et al. | |
| 2006/0248354 A1 | 11/2006 | Pineda De Gyvez et al. | |
| 2006/0288241 A1 | 12/2006 | Felter et al. | |
| 2006/0294400 A1 | 12/2006 | Diefenbaugh et al. | |
| 2007/0016706 A1 | 1/2007 | Arnold et al. | |
| 2007/0049134 A1 | 3/2007 | Conroy et al. | |
| 2007/0050644 A1 | 3/2007 | Merkin | |
| 2007/0067136 A1 | 3/2007 | Conroy et al. | |
| 2007/0083779 A1 | 4/2007 | Misaka et al. | |
| 2008/0276111 A1 | 11/2008 | Jacoby et al. | |
| 2010/0040085 A1 | 2/2010 | Olderdissen et al. | |
| 2010/0115293 A1 | 5/2010 | Rotem et al. | |
| 2011/0001358 A1 | 1/2011 | Conroy et al. | |
| 2011/0154064 A1 | 6/2011 | Niekrewicz et al. | |

FOREIGN PATENT DOCUMENTS

| | | |
|---|---|---|
| JP | 2002-163038 | 6/2002 |
| JP | 2002-175131 | 6/2002 |
| JP | 2003-514296 A | 4/2003 |
| JP | 2003-295986 | 10/2003 |
| WO | WO 01/35200 | 5/2001 |
| WO | WO 03/060678 A2 | 7/2003 |
| WO | WO 2006/019973 A1 | 2/2006 |
| WO | WO 2007/024403 A2 | 3/2007 |

OTHER PUBLICATIONS

PCT International Preliminary Report and Written Opinion for PCT Int'l. Application No. US2006/029049, mailed Nov. 29, 2006, (14 pages).

PCT Preliminary Report on Patentability and Written Opinion for PCT Int'l. Application No. PCT/US2006/029049, mailed Mar. 6, 2008, (10 pages).

PCT International Preliminary Report on Patentability Report on Patentability and Written Opinion for PCT Int'l. Application No. PCT/US2006/029244, mailed Mar. 6, 2008, (14 pages).

PCT International Search Report and Written Opinion for PCT Int'l Application No. PCT/US2008/013975 mailed Mar. 17, 2009, (13 pages).

PCT International Search Report and Written Opinion for PCT Int'l. Application No. US2008/014036, mailed Jul. 22, 2010, (14 pages).

* cited by examiner

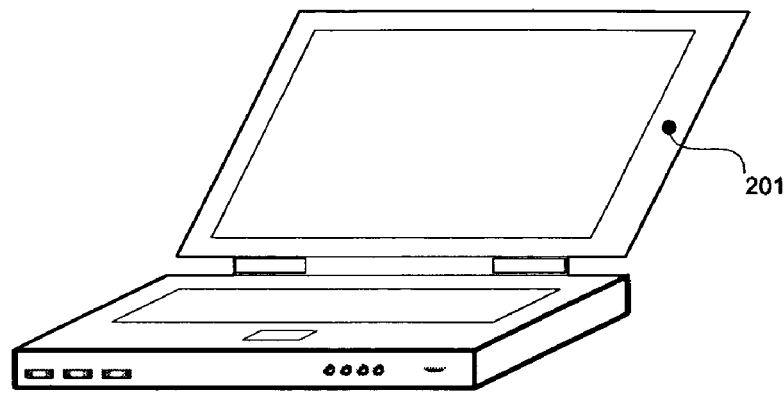
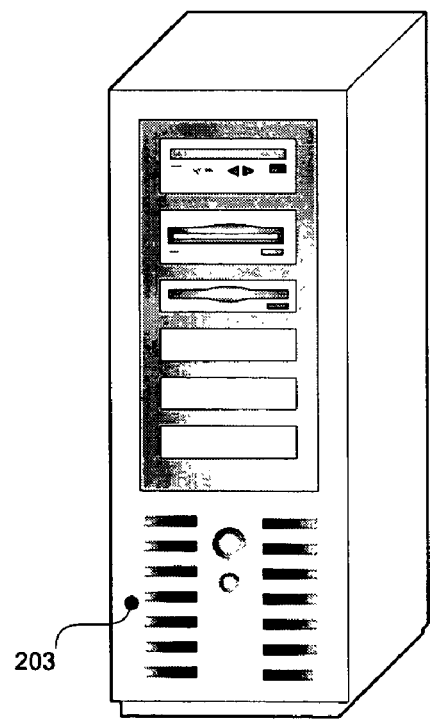
Fig. 2

| Throttle Setting 1 | CPU Core Voltage A | CPU Core Frequency A | Power Usage Requirement 1 |
| --- | --- | --- | --- |
| Throttle Setting 2 | CPU Core Voltage A | CPU Core Frequency B | Power Usage Requirement 2 |
| Throttle Setting 3 | CPU Core Voltage B | CPU Core Frequency B | Power Usage Requirement 3 |
| ⋮ | ⋮ | ⋮ | ⋮ |
| Throttle Setting n | CPU Core Voltage X | CPU Core Frequency Y | Power Usage Requirement N |

Increasing Performance Level ↓

METHODS AND APPARATUSES FOR DYNAMIC THERMAL CONTROL

TECHNOLOGY FIELD

At least some embodiments of the present invention relate generally to data processing systems, and more particularly but not exclusively to the management of temperatures in data processing systems.

BACKGROUND

Traditionally, computer systems are designed to be able to continuously run a fairly worst-case thermal load corresponding to a worst-case workload. Design according to such a continuous worst-case load has never been much of a problem, because traditionally the individual components have had modest operating power consumptions and the computer systems have had considerable cooling capacity so that the systems could sustain the load fairly naturally.

As the operating power consumptions of the individual components of computer system creep upwards, the thermal budgets of the computer systems have become tighter. The systems have become more difficult to cool. It is now becoming a challenge to design a computer system to run continuously the worst-case thermal load while pursuing other high performance goals, such as high computing power, compactness, quietness, better battery performance, etc.

For example, the systems may no longer be capable of continuously running worst-case workloads naturally without key parts of the system getting too hot.

For example, portable computer systems, such as laptop computers, have a compact housing and limited cooling capability; and thus a worst-case thermal load for a given cooling capability may limit the performance of the system because the worst-case thermal load may rarely occur and yet the system has been designed to sustain the continuous worst-case thermal load. This may mean that the laptop is larger to provide more cooling capability even though the worst-case thermal load may rarely occur.

SUMMARY OF THE DESCRIPTION

Methods and apparatuses for dynamically budgeting power usage to control temperatures in a data processing system are described here. Some embodiments of the present invention are summarized in this section.

In one aspect of an embodiment of the present invention, a data processing system with dynamic thermal control, includes a first sensor to determine an ambient temperature of an environment in which the data processing system is; and a controller (e.g., a microcontroller or a microprocessor) coupled to the sensor to control operations of the data processing system according to the ambient temperature. The ambient temperature is typically the temperature of the environment surrounding the data processing system.

In one example of an embodiment, the data processing system further includes a second sensor to determine an actual temperature of a component of the data processing system. The controller is to control the operations of the data processing system according to the actual temperature of the component and the ambient temperature.

In one example of an embodiment, the controller controls the operations of the data processing system based on a prediction of a temperature of the component which is a function of the ambient temperature, the actual temperature of the component, etc. In one example, the controller selects one from combinations of one or more voltage settings and one or more frequency settings to control operations of the data processing system.

In one example of an embodiment, the system further includes a voltage source (e.g., coupled to the controller) and a frequency source (e.g., coupled to the controller). The voltage source is capable of shifting from a first voltage to a second voltage to change a setting of the data processing system without restarting or stopping the data processing system; and the frequency source is capable of shifting from a first frequency to a second frequency to change a setting of the data processing system without restarting or stopping the data processing system.

In one example of an embodiment, the second sensor is to determine the actual temperature of the component periodically for the controller to determine an operating setting periodically.

In one aspect of an embodiment of the present invention, a data processing system, includes: a plurality of temperature sensors to determine a plurality of actual temperatures for the data processing system; and a controller coupled to the plurality of temperature sensors to determine an operating setting of the data processing system based on a prediction of a temperature of the data processing system which is a function of the plurality of actual temperatures and the operating setting of the data processing system.

In one example of an embodiment, the prediction of the temperature of the data processing system is based on heat generated from the power consumption according to a worst-case workload for the operating setting. In one example, the plurality of actual temperatures include an actual temperature at a location in the data processing system at a first time instance; the prediction of the temperature is for the same location at a time period after the first time instance; and the operating setting is determined to limit the predicted temperature under a threshold. In one example, the plurality of actual temperatures further include an actual temperature at a location in the data processing system toward which heat generated from the power consumption dissipates.

In one aspect of an embodiment, a method to control a data processing system, includes: determining an ambient temperature of an environment in which the data processing system is; and controlling operations of the data processing system according to the ambient temperature. In one example, the method further includes: determining an actual temperature of a component of the data processing system.

In one example of an embodiment, controlling the operations includes: selecting one from a plurality of operating settings according to the ambient temperature and the actual temperature of the component. In one example, the plurality of operating settings include combinations of one or more voltages and one or more frequencies; and controlling the operations of the data processing system includes: shifting from a first voltage to a second voltage according to the selected one of the plurality of operating settings; and shifting from a first frequency to a second frequency according to the selected one of the plurality of operating settings.

In one example of an embodiment, the selected one of the plurality of operating settings is selected to limit a predicted temperature of the component under a threshold; and the predicted temperature of the component is a function of the ambient temperature, the actual temperature of the component, and an operating setting.

In one example, determining the actual temperature of the component is performed periodically to perform the selecting periodically. In one example, the ambient temperature causes cooling of the component in the function; and an operating setting causes heating of the component in the function. In one example, the operating setting determines an upper limit of power consumption; and the predicted temperature of the component is predicted based on the upper limit of the power consumption.

In one example of an embodiment, the selected one of the plurality of operating settings includes a first setting for the component and a second setting for a further component.

In one aspect of an embodiment of the present invention, a method to control the data processing system, the method includes: determining a plurality of actual temperatures for the data processing system; and adjusting an operating setting of the data processing system according to a predicted temperature which is a function of the plurality of actual temperatures and the operating setting of the data processing system.

In one example of an embodiment, the operating setting determines an upper limit of power consumption of at least a portion of the data processing system; and the predicted temperature is based on heat generated from the power consumption according to the upper limit.

In one example of an embodiment, the plurality of actual temperatures include an actual temperature at a location in the data processing system at a first time instance; the predicted temperature is for the same location at a time period after the first time instance; and the operating setting is adjusted to limit the predicted temperature under a threshold.

In one example, the plurality of actual temperatures further include an actual temperature at a location in the data processing system toward which heat generated from the power consumption dissipates.

In one example, the method further includes: determining an allowable amount of power consumption of a heat source for a time period subsequent to the determination of at least one of the actual temperatures to limit the predicted temperature under a threshold. The operating setting is adjusted according to the allowable amount of power consumption.

In one embodiment, examples of operating settings include: a voltage setting; a frequency setting; a disk spin rate setting; and a fan speed setting. In one example, the operating setting is for at least one of: a Central Processing Unit (CPU) microprocessor, a Graphical Processing Unit (GPU) microprocessor, a bus, and a disk drive, etc., of the data processing system.

In one example, adjusting the operating setting includes: adjusting a voltage source from a first voltage to a second voltage; and adjusting a frequency source from a first frequency to a second frequency. In one example, the adjusting is performed without stopping or restarting the data processing system.

In one aspect of an embodiment of the present invention, a method to operate a data processing, includes: predicting an operating temperature, of the data processing system, at a future time; and setting an operating setting of at least one component of the data processing system based on, at least in part, the operating temperature, which was predicted.

In one example of an embodiment, the operating setting is for the time period in the future; and the time period is in an order no larger than a thermal time constant of the data processing system. In one example, the operations of predicting and setting are performed in a periodic way.

In one example of an embodiment, the operating temperature is predicted based on a measurement of a current ambient temperature and a measurement of a current temperature of a component of the data processing system (and the power consumption).

In one example of an embodiment, the operating setting is set to limit the predicted operating temperature below a temperature threshold.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 2 illustrates examples of locations to measure ambient temperature for thermal control according to one embodiment of the present invention.

FIG. 5 illustrates an example of using throttle settings of a central processing unit (CPU) of a data processing system to control temperature according to one embodiment of the present invention.

DETAILED DESCRIPTION

Figure 1:
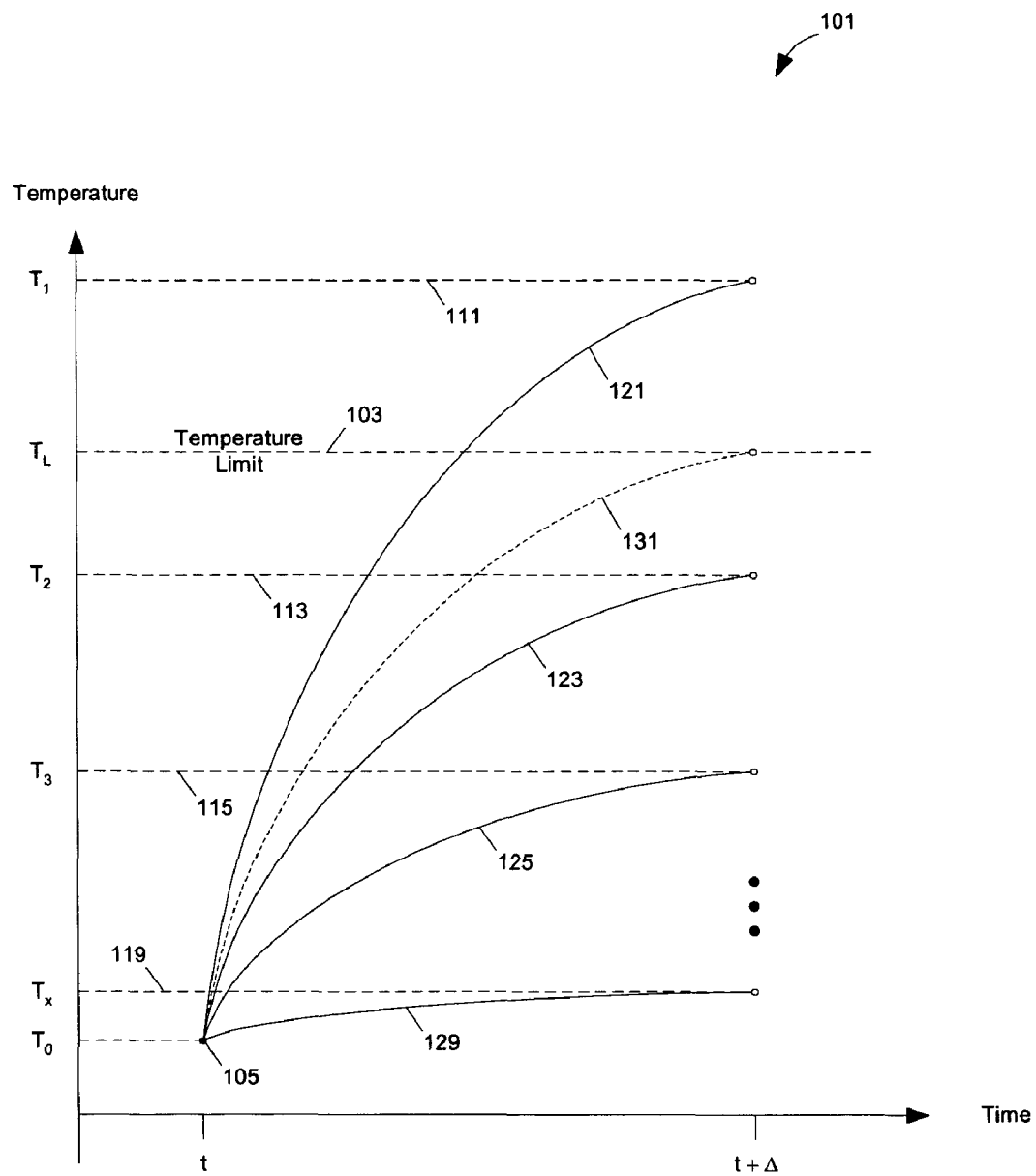
FIG. 1 illustrates a method to control a temperature in a computer system according to one embodiment of the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

One embodiment of the present invention uses thermal throttling to allow a system to run under the dynamically determined thermal budget so that the system can operate in an appropriate operating setting under the dynamically determined thermal limit for the current workload, even if the system may not be capable of sustaining a worst-case workload under certain normal usage conditions.

In the prior art, the computer systems were typically designed to have sufficient cooling capabilities, or limited worst-case power consumptions, such that when in a continuous worst-case power consumption mode corresponding to the worst-case workload the computer system is not over heated to exceed thermal limits. In the worst-case scenario, all of the components of the computer system were drawing their maximum (in this case, worst level) amount of power. This worst case scenario essentially adds together the worst case, maximum level, power consumption; and for the cooling aspect of the computer system the design took this scenario into account to allow the system the sufficient capability of dissipating the heat generated from the continuous worst-case power consumption.

However, such a worst-case scenario typically occurs rarely (infrequently). Thus, designing a computer system to sustain the worst-case load can be overly conservative for typical usages.

In one embodiment of the present invention, it is recognized that power consumption in a computer system typically changes frequently during typical usages. Typically, not all components are simultaneously in the maximum power consumption mode. Further, some components may not be in the maximum power consumption mode for a long period of time. The power consumption of a component, such as the central processing unit (CPU) microprocessor, may change dramatically over time in typical usages. Thus, design a computer system according to the worst-case load can be overly conservative for typical usages.

In one embodiment of the present invention, a computer system has controls (throttles) on sources of heat which are attached to a part of the system which is to be prevented from getting too hot. The throttles limit the maximum power which can be consumed by the sources of heat, which limits the rate at which the temperature can rise. The throttle settings may correspond to different settings of performance levels or different operating settings.

For example, the CPU (central processing unit) microprocessor may work under different core voltages and core frequencies. Using a high core voltage and a high frequency, the microprocessor can be optimized for computation with a higher power consumption. Using a low core voltage and a low frequency, the microprocessor can be optimized for battery performance at a degraded computational performance level.

In one embodiment, the microprocessor can shift from one voltage level to another by slowly changing the voltage and from one frequency to another by slowly changing the frequency without stopping or pausing the computational tasks of the processor. Further details on changing CPU core voltage and frequency can be found in U.S. patent application Ser. No. 10/917,719, filed Aug. 12, 2004, which is hereby incorporated herein by reference.

In one embodiment of the present invention, the computer system dynamically arranges the throttle settings so that the temperature to be controlled does not rise beyond the system's limits.

In one embodiment of the present invention, a computer system is designed to optimize performances for typical usages. However, worst load cases can occur. To avoid damage to the computer system, a dynamic power management system is used to dynamically budget the power usage of at least some of the components of the computer system such that when the heavy tasks are imposed on the system, the system can trade performance for staying within the thermal limits.

In general, thermal time constants are fairly long in comparison to the time periods for adjusting the throttle settings. In one embodiment of the present invention, when a temperature is observed to get close to the system's limits, the system can quickly arrange that the power consumption requirement of the heat source is reduced even if the component is to run the worst-case workload; and the power of the troublesome heat source is reduced long before the temperature actually exceeds the system's limits. Thus, the system degrades performance on demand in response to current thermal conditions, which depend on the current ambient temperature, the current temperature(s) of the computer, etc.

In one embodiment of the present invention, a computer system has throttled components, one or more sensors to measure the temperature(s) of the part of the system being managed, and one or more sensors to measure conditions to predict the rate at which the part of the system being managed cools down, such as the ambient temperature.

In one embodiment, to implement thermal throttling, the computer system determines the actual (measured) temperature of the part of the system and predicts the corresponding temperature that may occur after a period of time of worst-case workload, based on the power consumption requirement of the throttled component(s) for the worst-case workload, the measurement of conditions for cooling (e.g., ambient temperature) and the current actual temperature.

In one embodiment, a throttle setting is selected and used such that the predicted temperature is in accordance with the thermal constraint. For example, different throttle settings can be examined to determine whether or not the throttle settings are allowable; and a "best" allowable setting can be selected for use in the next time period.

Alternatively, an allowable amount of power consumption can be determined for the throttled component(s) such that, if the power consumption of the throttled component(s) is below the allowable amount, the predicted temperature will be less than the thermal threshold. The allowable amount of power consumption can then be compared to the worst-case power usage requirements of different throttle settings to determine the allowable throttle setting.

In one embodiment, the selection of the allowable throttle setting is performed frequently (e.g., in time period(s) less than the thermal time constants of the system) and periodically. For example, the dynamical thermal control can include the following operations.

1) Measure T, the current temperature of the part of the system being managed.

2) Adjust T to account for heat loss in the subsequent period of time.

3) For throttle setting i, set $T_{max}[i]$, an estimate of the highest temperature which could be reached at the throttle setting, according to the heat generated by the worst-case power consumption at the throttle setting i.

4) Determine the highest throttle settings for which $T_{max}[i]$ is less than or equal to the system's limit and make this the current throttle setting until the next iteration of the thermal throttling. In one embodiment, the higher throttle settings are more desirable than the lower throttle settings (e.g., faster, quieter, etc.)

As an example in one embodiment, if the heat loss is mainly convective, the adjusted temperature Ta to account for heat loss in a time period $\Delta$ can be evaluated according to:

$$T_a = T_{amb} + (T - T_{amb}) e^{-\Delta/\tau_{cool}},$$

where $T_{amb}$ is a measurement of the ambient temperature; and $\tau_{cool}$ is the time constant of the convective cooling path.

As an example in one embodiment, the temperature after the period of time $\Delta$ can be predicted according to the thermal consequences of a pulse of power $P_{max}[i]$ being applied to the part of the computer. For example, the predicted temperature $T_{max}[i]$ at throttle setting i can be computed according to:

$$T_{max}[i] = T_a + P_{max}[i] \, \theta \, (1.0 - e^{-\Delta/\tau_{heat}}),$$

where $P_{max}[i]$ is the maximum power consumption of the heat source at the throttle setting i; $\theta$ is the thermal resistance between the heat source and the part of the system being managed; and $\tau_{heat}$ is the time constant of the heating path.

In general, the prediction may involve more parameters to account for factors, such as the influence of a heat-generating neighbor, working condition of cooling units and/or other modes of heat dissipation, such as radiative heat dissipation.

In one embodiment of the present invention, the prediction of the temperature is based on the actual (measured) current temperature and predicted for a short time period. Since prediction error does not accumulate, the prediction does not have to be very accurate.

In one embodiment of the present invention, the time period $\Delta$ is small when compared to the time constants of the heating and/or cooling paths. For example, time period $\Delta$ is smaller that $\tau_{heat}$.

Radiative heat dissipation is typically much slower than convective heat dissipation. The radiative heat dissipation typically can be neglected when the convective cooling is present. In systems where the convective heat dissipation is weak (e.g., a system without a fan, a system in an enclosed housing, etc.), the radiative heat dissipation may become important. In general, a prediction may be based on an analytical thermal approximation, an empirical expression, or combinations of analytical solutions and empirical expressions.

Note that although the above example describes a situation where convective cooling dominates and the time constant of cooling is constant, the methods of prediction can be extended to account for other cooling processes and to account for time constants of cooling which are functions of a throttle parameter. For example, a convective cooling system with a variable speed fan can have throttle settings for fan speed; and the time constant $\tau_{cool}$ can be a function of fan speed.

Further, the prediction can also be extended to deal with the situation where there are multiple heat sources attached to the same part of the system. The predicted temperature can be computed from a sum of the contributions from the various attached heat sources. For example, $$T_{max}[i] = T_a + P_{1,\,max}[i]\,\theta_1\,(1.0 - e^{-\Delta/\tau_{heat1}}) + P_{2,\,max}[i]\,\theta_2\,(1.0 - e^{-\Delta/\tau_{heat2}}) + \ldots$$

wherein the $P_{1,\,max}[i]$, $P_{2,\,max}[i]$, ... are the maximum power consumptions of the heat sources 1, 2, ... at the throttle setting i; $\tau_{heat1}$, $\tau_{heat2}$, ..., are the time constants of the corresponding heating paths; and $\theta_1$, $\theta_2$, ..., are thermal resistances between the heat sources and the part of the system being managed.

In one embodiment of the present invention, multiple copies of throttle settings can be determined based on different constraints, for example, one for each boundary condition of temperature. The lowest one of the multiple copies of throttle settings is then used to ensure that the all constraints are satisfied. Typically, the performance is set by the subsystem which is in the most trouble.

Further, in one embodiment of the present invention, multiple copies of throttle settings can be further determined based on different constraints, for example, one for each boundary condition of power. For example, the system may not have a power supplier (e.g., battery) that can continuously sustain power consumption above certain limit (e.g., a limit on the average discharge current for the continuous usage of a battery without causing damage or degrading the battery performance). Based on the actual past power usage history, one or more copies of throttle settings can be determined based on the power usage constraints. The lowest one of the multiple copies of throttle settings can then be used to ensure that the all constraints, thermal and power, are satisfied. Further details about dynamic power estimation and control can be found in co-pending U.S. patent application Ser. No. 11/212,970 entitled "Methods and Apparatuses for Dynamic Power Control" filed on Aug. 25, 2005 and co-pending U.S. patent application Ser. No. 11/212,974 "Methods and Apparatuses for Dynamic Power Estimation" filed on Aug. 25, 2005, both by inventors Dave Conroy, Keith Cox, Michael Culbert and filed on the same date as the present application, which are hereby incorporated herein by reference.

The dynamic throttle setting determination can be performed in a variety of components in the computer system, including the main processor of the computer system, or a microcontroller dedicated to the dynamic thermal throttling task.

There are advantages to executing the algorithms in the main processor, such as reduced cost, and the elimination of any need to communicate between the main processor and whatever other agent that is alternatively used to perform the task. However, it is difficult to arrange dynamic thermal throttling in all situations, including when the software in the main processor fails or being replaced with some other software which has no knowledge of the thermal management. Further, when the computer system is in an otherwise idling state, the periodic management task may prevent the system from entering a low power state, or periodically wakes the system from the low power state.

When the ability to load throttle settings is reserved to the main processor of the computer system and the dynamic throttle determination is not performed in the main processor, making the computed throttle setting the current throttle setting may become complicated. The throttle settings need to be communicated to the main processor; and in most situations, it may be necessary to implement fail-safe mechanisms to deal with the (unlikely) case that the software running in the main processor ignores the command to load the throttles. The fail-safe mechanisms can be fairly crude, since they should only be engaged in emergency situations. For example, when the microcontroller determines that the temperature that is controlled is exceeding a limit, the microcontroller may assume that the throttling settings are not enforced properly and automatically initiate a shutdown process.

One embodiment of the present invention dynamically budgets the power usage for components of a data processing system that may have a thermal constraint, such as in thin-and-light portables computers, or larger portables, and/or small consumer desktops. For example, the constraint of heat dissipation on a computer system with a compact housing may limit the power usage. In one embodiment, the real-time heat dissipation condition is used to dynamically budgets the power consumption and prevent overheating from excessive power consumption.

FIG. 1 illustrates a method to control a temperature in a computer system according to one embodiment of the present invention.

In FIG. 1, a current actual temperature (e.g., measured temperature at time instant t) is used to predict the temperature after a period of time $\Delta$ (e.g., predicted temperature at time instant t+$\Delta$).

In one embodiment, a computer system has a number of different settings. For example, the CPU processor of the computer system may be set to run under different core voltages and/or different core frequencies. Different settings of the CPU processor correspond to different worst-case power usages. Further, for example, a cooling fan may be set to run at different speeds.

In general, the different settings corresponding to different performance levels with different impacts on heat generation/dissipation. Thus, adjusting the settings of the computer system can adjust the trade-offs in the performance of the system, such as computing speed, quietness, battery life, etc. and the thermal constraint.

The power requirement at each setting corresponds to the maximum possible power usage at the corresponding setting. Depending on the tasks being performed, the actual power consumptions can vary within a range; and the actual power consumptions are typically and frequently less than the maximum possible power usage.

When the computer is given the worst-case workload, the temperature of the part of the computer typically changes (e.g., rises or falls) differently at different settings.

For example, the temperature of the part of the computer is $T_0$ (105) at time t. When the computer is given the worst-case workload, the temperature may change according to curves (121, 123, 125, ..., 129) during the time period $\Delta$ after time t to temperatures $T_1$, (111), $T_2$ (113), $T_3$ (115), ... $T_x$, (119) respectively.

In one embodiment of the present invention, instead of designing the system to sustain the continuous worst-case workload for the top performance setting for a long period of time, the system is designed to automatically select a performance setting for a short period of time $\Delta$ such that after the time period the temperature is within the limit (103). If the current temperature ($T_0$) is low, the system may allow to be set to the top performance setting; if the current temperature ($T_0$) is high, the system will choose a reduced performance setting.

In the example of FIG. 1, the performance setting corresponding to the curve (121) is not allowable since if the computer were set to this performance setting and given the worst-case workload during the time period $\Delta$, the temperature of the part of the computer will reach $T_1$ (111) and exceed the limit $T_L$ (103). The performance settings corresponding to the curves (123, 125, 129, ...) are allowable according to the temperature limit $T_L$ (103).

In one embodiment of the present invention, the temperatures $T_1$ (111), $T_2$ (113), $T_3$ (115), ... $T_x$ (119) at the time t+$\Delta$ are predicted using the current temperature $T_0$ and other parameters, such as ambient temperature for the cooling, etc., to select the allowable setting for the computer for the time period between time t and t+$\Delta$.

Since the worst-case workload is assumed for the time period $\Delta$, the actual temperature after the time period $\Delta$ will be no more than the corresponding temperatures $T_1$, $T_2$, $T_3$, ..., $T_x$ for the corresponding settings.

The typical usages of computer systems (e.g., portable computers or desktop computers) may not require a continuous worst-case power load for a long period of time. Typically, a burst of computational tasks may require an instantaneous worst-case power load which lasts only for a short period of time before the tasks are completed. Before and after the burst of the tasks, the computer system typically consumes a power load that is much lower than the worst-case power load; and the computer system is at a low temperature. Thus burst of power consumption may or may not be sufficient to cause the temperature to rise above the temperature limit. Typically, the part of the computer heats up for a short period of time and then cools down before the temperature exceeds the limit. Thus, it may be tolerable to allow bursts of high computational performance for typically usages. This allows the design of a computer system that delivers high performance under tight thermal constraints for typically usages.

In one embodiment of the present invention, the system dynamically adjusts power usage so that even when the worst-case power load for these throttles occur, the temperature of the part of the computer does not rise to exceed the limit.

Since worst-case power loads are rare, the throttle controls are normally set to very high values, and the system acts as if the limit does not exist since the demand of the system is lower than the dynamically determined budget.

In one embodiment, the time period for determining the throttle setting may not be constant. For example, when a significant power usage event occurs (e.g., when the temperature is approaching the limit), the system may automatically change the time period for starting a new computation of the throttle setting. For example, the system may adjust the time period when the fan speed changes.

Typically, the components (subsystems) whose throttle is adjusted may not actually consume the entire amount of power that is budgeted, since these components may not be busy enough to run at the maximum power load for the throttle setting. The adjustment of the throttle allows the subsystem the freedom to consume up to the worse case power load for the corresponding throttle setting without violating power constraints.

The cooling of the computer system is typically a function of the current ambient temperature. In one embodiment of the present invention, the ambient temperature of the environment to which heat generated from the power consumption of the computer is dissipated is measured for the prediction of the worst-case temperatures for different settings and for the selection of the setting that will not violate the temperature limit.

Alternatively, the allowable amount of power consumption can be determined from targeting the predicted temperature at the temperature limit (e.g., according to curve 103). The allowable amount of power consumption can then be used to select the throttle setting.

FIG. 2 illustrates examples of locations to measure ambient temperature for thermal control according to one embodiment of the present invention.

In one embodiment of the present invention, one or more temperature sensors are used to determine the ambient temperature of the working environment of the computer. For accurate results of temperature prediction, the ambient temperature sensors are positioned away from heat sources and heat dissipation paths. A thermal insulator may be placed between the ambient temperature sensor and the external housing of the computer.

For example, a temperature sensor (201) can be positioned in the middle portion of the display panel of a portable computer.

For example, a temperature sensor (203) can be positioned near the side portion of the tower.

In one embodiment, the ambient temperature sensor is positioned near an opening in the housing of the computer. In one embodiment, the ambient temperature sensor is positioned on the path of intake cooling air that has the ambient temperature.

Figure 3:
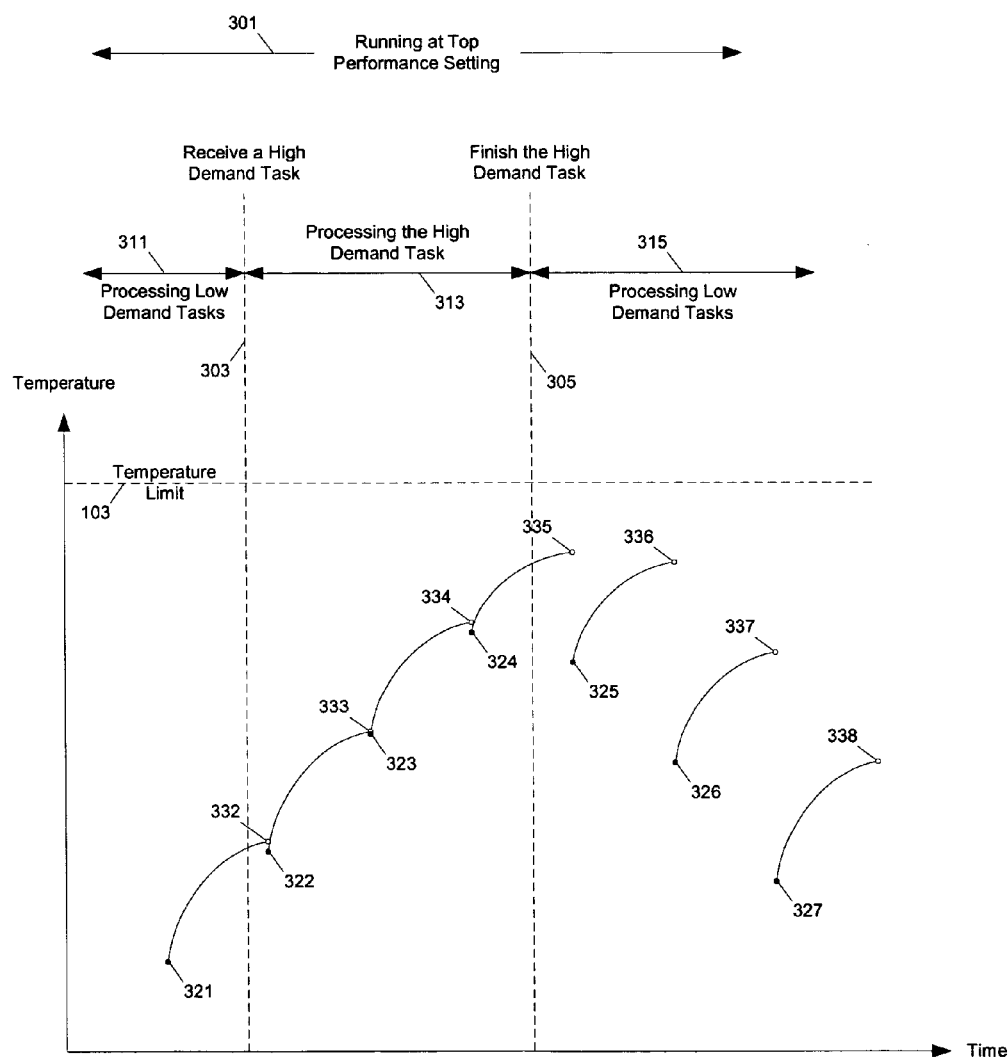
FIGS. 3-4 illustrate example scenarios in a data processing system having dynamic thermal control according to one embodiment of the present invention.
Figure 4:
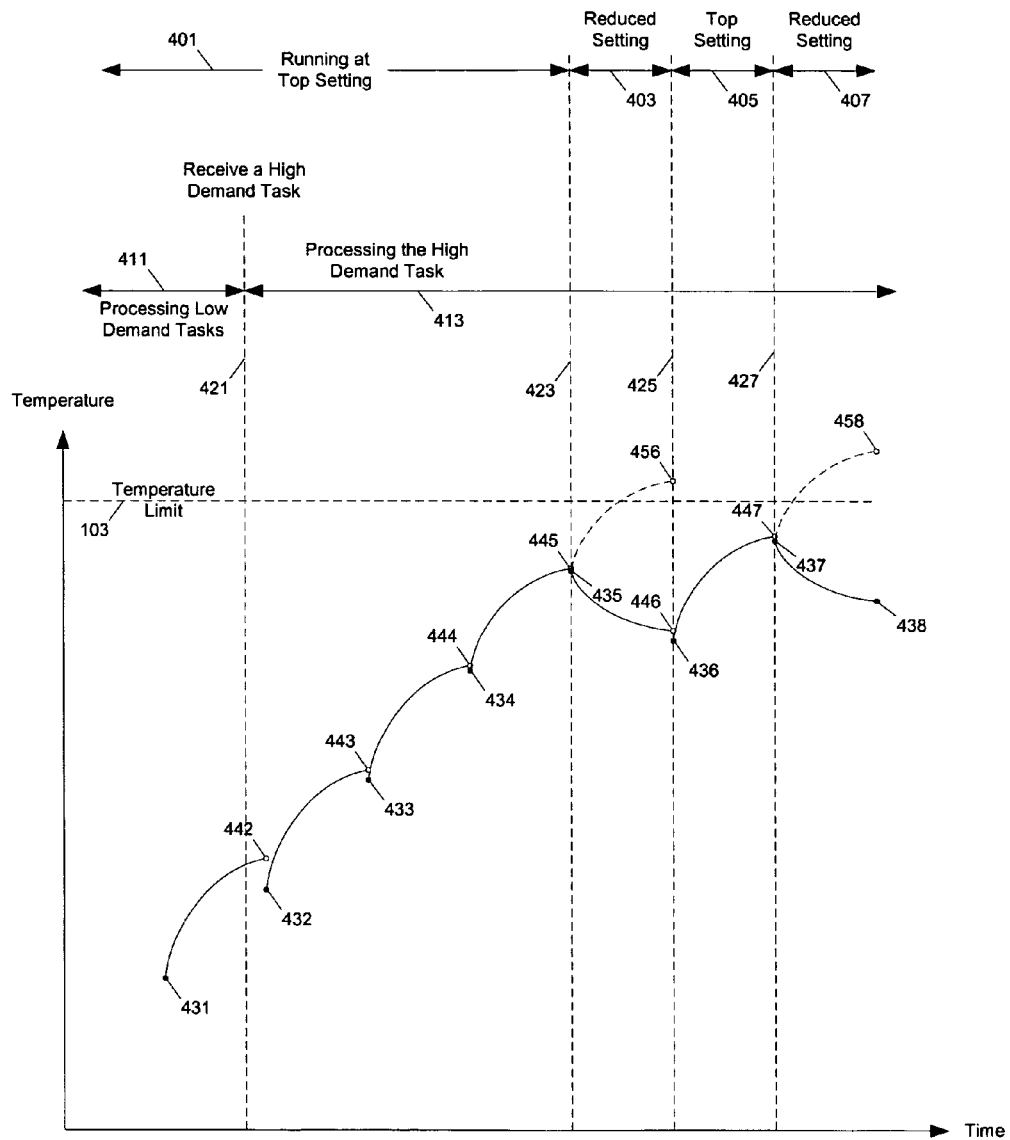

FIGS. 3-4 illustrate example scenarios in a data processing system having dynamic thermal control according to one embodiment of the present invention.

In the scenario of FIG. 3, the computer system processes (311) low demand tasks before time instance (303); the actual power consumed by the system is low; and actual temperature (321) is low and far below the temperate limit (103). Since the actual temperature of the system is low, the system can be at the top performance setting (301).

After time instance (303), a high demand task is received. The system becomes busy in processing (313) the high demand task. Since the system had a low temperature before the reception of the high demand task, the predicted temperatures (e.g., 332, 333, 334, 335) are lower than the temperate limit (103) even though the system remains in the top performance setting. The actual temperatures (e.g., 322, 323, 324) are typically lower than or close to the predicted temperatures (e.g., 332, 333, 334), since the system is processing the near worst-case load.

After each time period, the actual temperature is used as a starting point for the next prediction. Thus, prediction error is not accumulated.

After the high demand task is finished at time instance (305), the actual power usage comes down; and the actual temperature (e.g., 325, 326, 327) falls further below the temperature limit (103). Since the predicted temperatures (336, 337, 338) are lower than the temperature limit (103), the system can remain (301) in the top performance setting to process (315) low demand tasks.

The usage pattern as illustrated in FIG. 3 can be a typical one for certain uses. Thus, the system can be designed on a tight thermal constraint while running at top performance setting, which if designed according to a continuous worst-case load would require a much higher cooling capacity.

However, the high demand task can be such that it may take a long period of time to finish the task. If the system were allowed to be in the top performance setting for a long period of time, the temperature limit (103) would be eventually violated.

For example, in FIG. 4, before time instance (421) of receiving a high demand task, the system processes (411) low demand tasks, as indicated by the low actual temperature (431). The system is running (401) at top setting.

After the time instance (421), the system processes (413) the high demand task for a period of time.

Initially, the system remains (401) in the top setting, which causes the temperature of the part of the computer to rise (e.g., 432, 433, 434, 435). Since the predicted temperatures (442, 443, 444, 445) are below the temperature limit (103), the system remains running at the top setting.

At the time instance (423), the thermal manager recognizes that the predicted temperature (456) would be above the limit (103) if the system remains in the top setting and that the predicted temperature (446) would be below the limit (103) if the system changes to the reduced setting (403). Thus, between time instances (423 and 425) the system runs in the reduced setting.

At the time instance (425), the actual temperature (436) is reduced. The thermal manager recognizes that the predicted temperature (447) would be below the limit (103) if the system changes to the top setting (405). Thus, between time instances (425 and 427) the system runs in the top setting.

At the time instance (427), the actual temperature (437) is again approaching the limit (103). The thermal manager recognizes that the predicted temperature (458) would be above the limit (103) if the system remains in the top setting and that the predicted temperature (438) would be below the limit (103) if the system changes to the reduced setting (407). Thus, in a short time period after the time instance (427) the system runs in the reduced setting (e.g., reaching the temperature 438).

Thus, when the processing of the high demand task lasts for a long period of time, the system automatically adjusts its settings to allow the temperature to approach the limit (103) but not exceed the limit.

In one embodiment of the present invention, the prediction provides the upper bound of the temperature; and the actual temperature does not exceed the limit.

In one embodiment, the prediction may be lower than the upper bound of the temperature by a small margin; and the actual temperature may exceed the limit by the small margin.

In one embodiment, since the time step to adjust the performance settings and the error margin are small, the amount exceeding above the temperature limit (103) is practically negligible. Thus, it can be practically considered that the limit (103) is not exceeded.

Thus, under the control of the dynamic throttling system, the system switches between the top setting and the reduced setting to process the high demand task as fast as possible within the limit of thermal constraint.

FIG. 5 illustrates an example of using throttle settings of a central processing unit (CPU) of a data processing system to control temperature according to one embodiment of the present invention.

In FIG. 5, a number of different combinations of CPU core voltages and core frequencies are sorted so that the throttle setting increases with the performance level, as illustrated in table 501. In one embodiment, the system searches in the order of decreasing throttle setting to determine the first throttle setting that satisfies the relation that the predicted temperature is below the temperature limit.

Thus, when a throttle setting is determined, both the CPU core voltages and frequencies are determined.

Alternatively, the throttles may be sorted according to other goals (e.g., combined goal of high computing power and low energy consumption, etc.); and a "best" throttle setting can be searched in a similar way.

Note that if there are multiple independent throttles, a list of different combination of throttles can be examined to determine the allowable throttle settings. A best setting of the throttles can be selected according to certain rules that define the objective "best". It is understood that the rules for define the objective can be arbitrarily complex.

Figure 6:
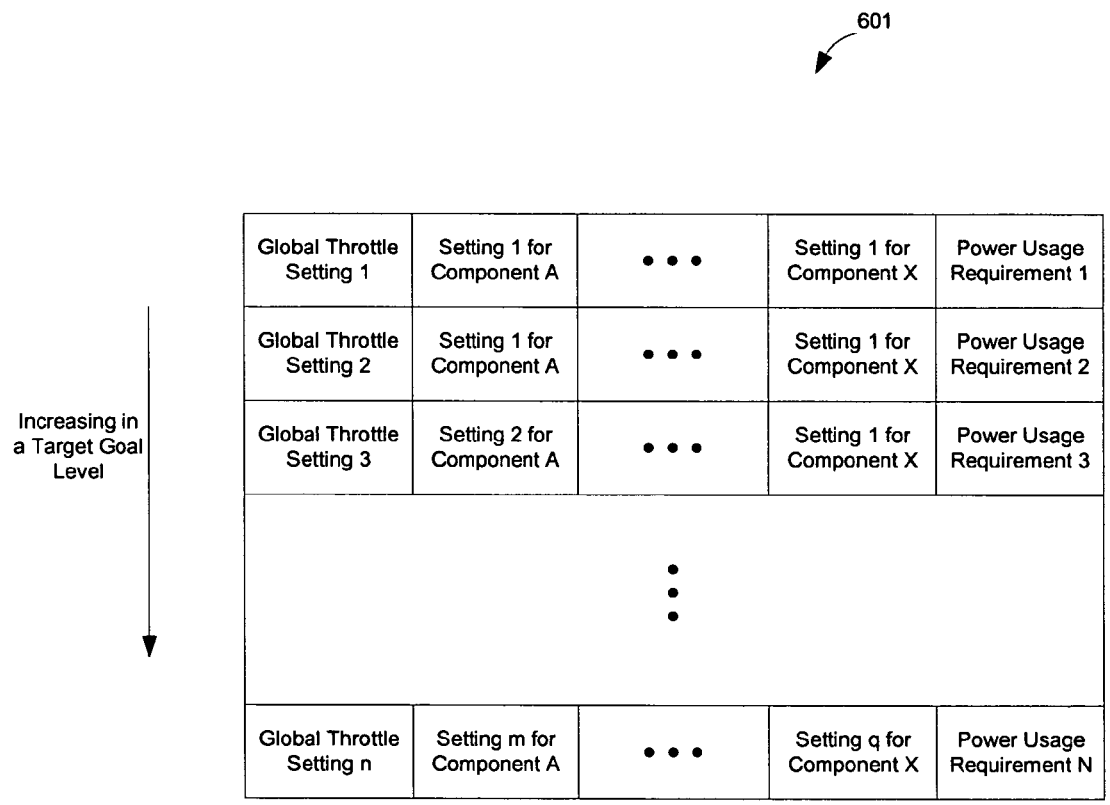
FIG. 6 illustrates an example of using throttle settings of multiple components of a data processing system to control temperature according to one embodiment of the present invention.

FIG. 6 illustrates an example of using throttle settings of multiple components of a data processing system to control temperature according to one embodiment of the present invention.

In FIG. 6, multiple components have independent throttle settings, as illustrated in table 601. To distribute the dynamically determined budget to the multiple components, different combinations of the throttle settings for the multiple components can be viewed as different global throttle settings. The global throttle settings can be sorted according to a target goal level.

The sorting of the global settings can be performed at the design stage of the computer according to a static, fixed target goal function, or manually arranged by the designer of the system.

Alternatively, the global settings can be performed in real time according to a target goal function, which may be a function of current state of the computer system. For example, some of the components may be busy and require higher priority while others may be in idle and require lower priority. Thus, the target function can be constructed to include the consideration of the current workloads of the components. The workloads can be estimated from the history of the actual power consumptions. For example, the high power consumption with respect to the dynamic power range of the component indicates a high workload for the component.

Once the global settings are sorted according to the target goal level, the highest global setting that satisfies the power constraint is selected.

Figure 7:
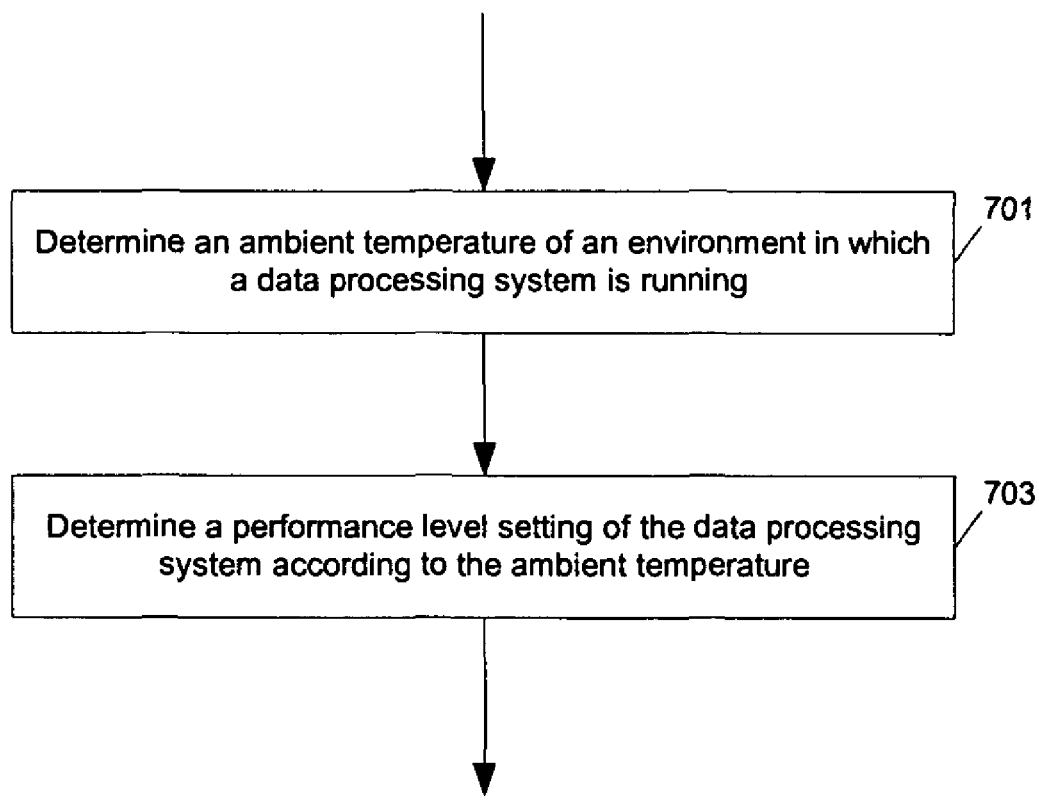
FIGS. 7-9 illustrate methods of thermal management according to embodiments of the present invention.
Figure 8:
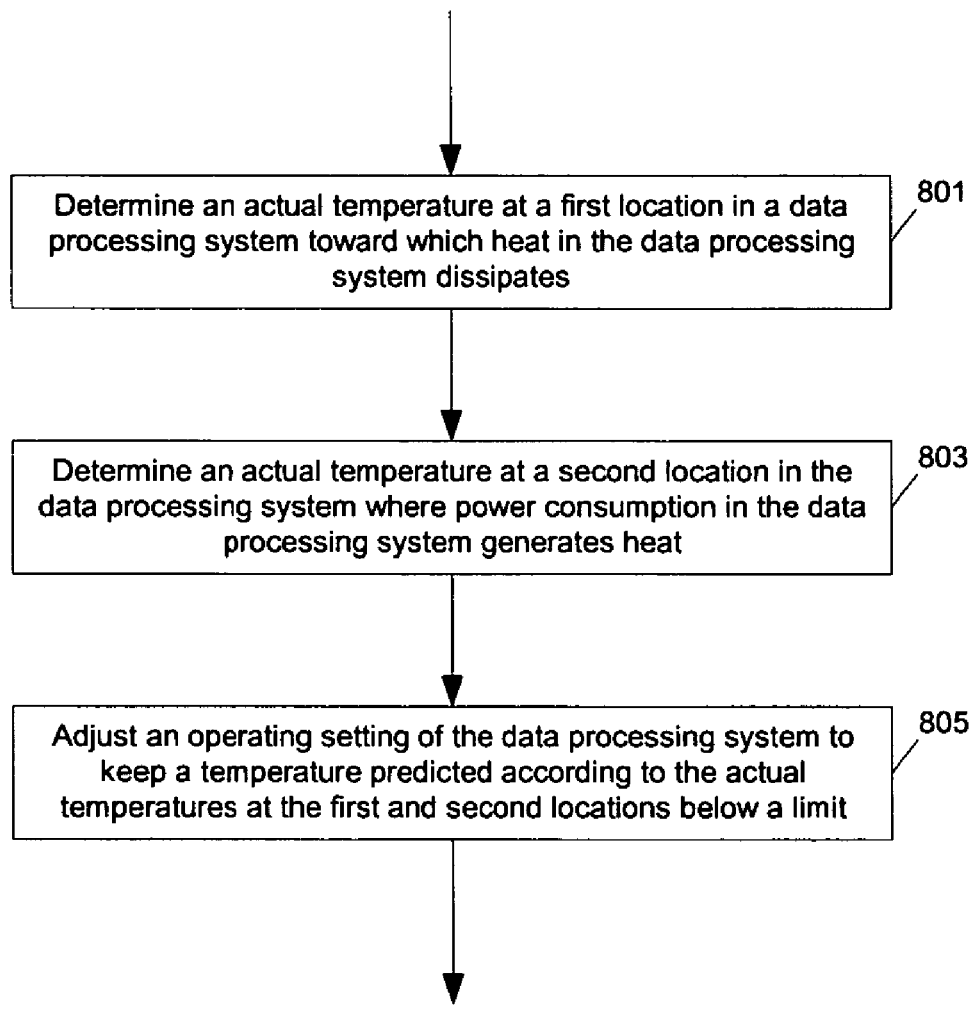
Figure 9:
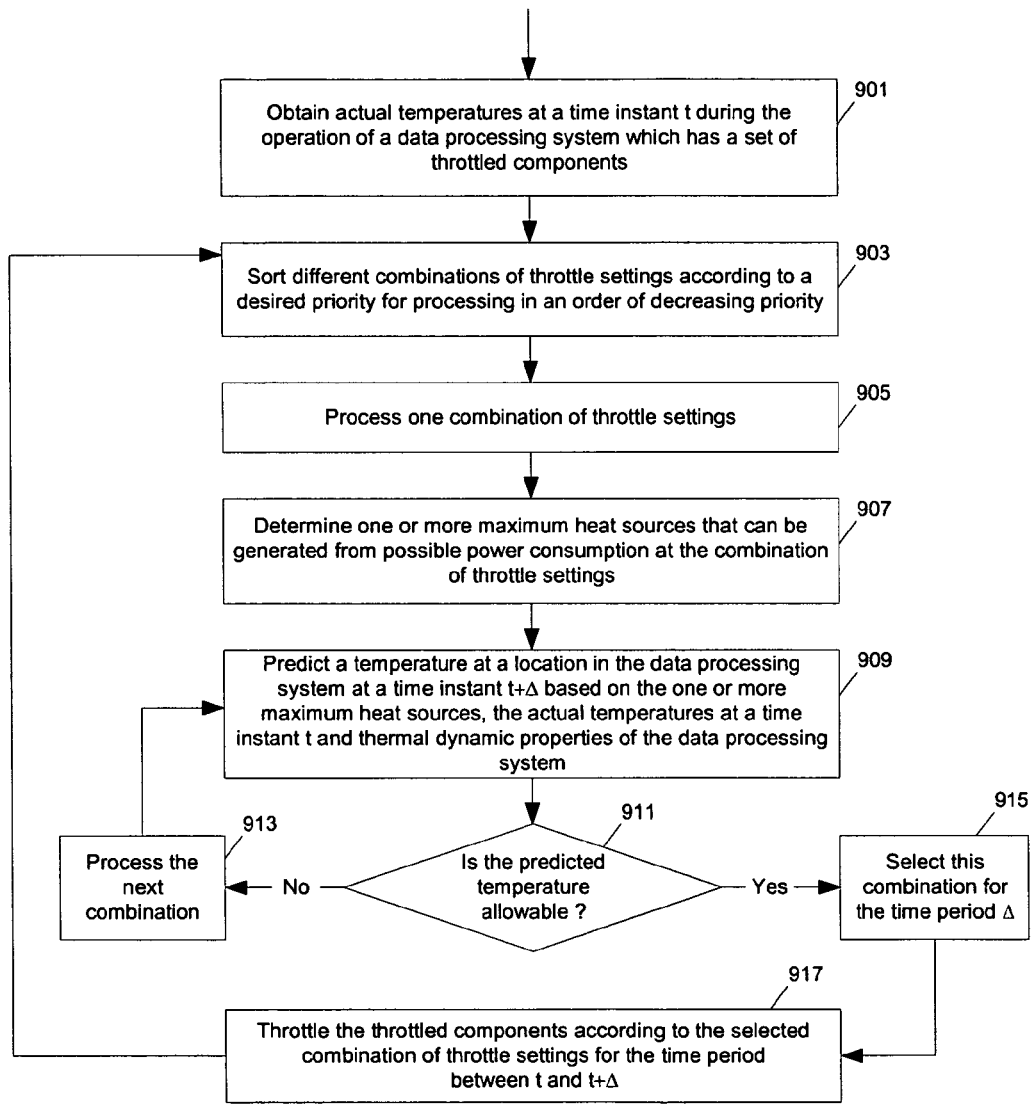

FIGS. 7-9 illustrate methods of thermal management according to embodiments of the present invention.

In FIG. 7, operation 701 determines an ambient temperature of an environment in which a data processing system is running. The ambient temperature can be measured at various locations as illustrate in FIG. 2, where the temperature measurements are not affected by the heat generated in computer system. However, it is understood that the influence of the heat generated in the computer system typically affects the temperature prediction in a conservative way (e.g., predict a higher temperature). Operation 703 determines a performance level setting (or operating setting) of the data processing system according to the ambient temperature. For example, a computer system can automatically select a performance level setting (or operating setting), such as CPU core voltage and frequency, based on the ambient temperature. For better performance, the selection may further based on other parameters, such as the current temperature of the computer, the length of time period in which the performance level setting (or operating setting) is used before the next update, etc.

For example, in FIG. 8, operation 801 determines an actual temperature at a first location in a data processing system toward which heat in the data processing system dissipates. Operation 803 determines an actual temperature at a second location in the data processing system where power consumption in the data processing system generates heat. Operation 805 adjusts an operating setting of the data processing system to keep a temperature predicted according to the actual temperatures at the first and second locations below a limit. In one embodiment, the prediction is based on the assumption that the data processing system will have the worst-case workload in a limited time period (e.g., in an order smaller or comparable to the thermal time constant of the system) during which the operating setting will be used. In one embodiment, different operating settings do not affect the functionality of the system except the performance of the system.

In FIG. 9, operation 901 obtains actual temperatures at a time instant t during the operation of a data processing system which has a set of throttled components. Operation 903 sorts different combinations of throttle settings according to a desired priority for processing in an order of decreasing priority. Operation 905 processes one combination of throttle settings. Operation 907 determines one or more maximum heat sources that can be generated from possible power consumption at the combination of throttle settings. Operation 909 predicts a temperature at a location in the data processing system at a time instant t+$\Delta$ based on the one or more maximum heat sources, the actual temperatures at a time instant t and thermal dynamic properties of the data processing system.

If operation 911 determines that the predicted temperature is not allowable, operation 913 processes the next combination and operation 909 is repeated until the predicted temperature is allowable.

If operation 911 determines that the predicted temperature is allowable, operation 915 selects this combination for use in the time period $\Delta$. Operation 917 throttles the throttled components according to the selected combination of throttle settings for the time period between t and t+$\Delta$. In one embodiment, there will always be an allowed setting.

Many of the methods of the present invention may be performed with a digital processing system, such as a conventional, general-purpose computer system. Special purpose computers, which are designed or programmed to perform only one function, may also be used.

Figure 10:
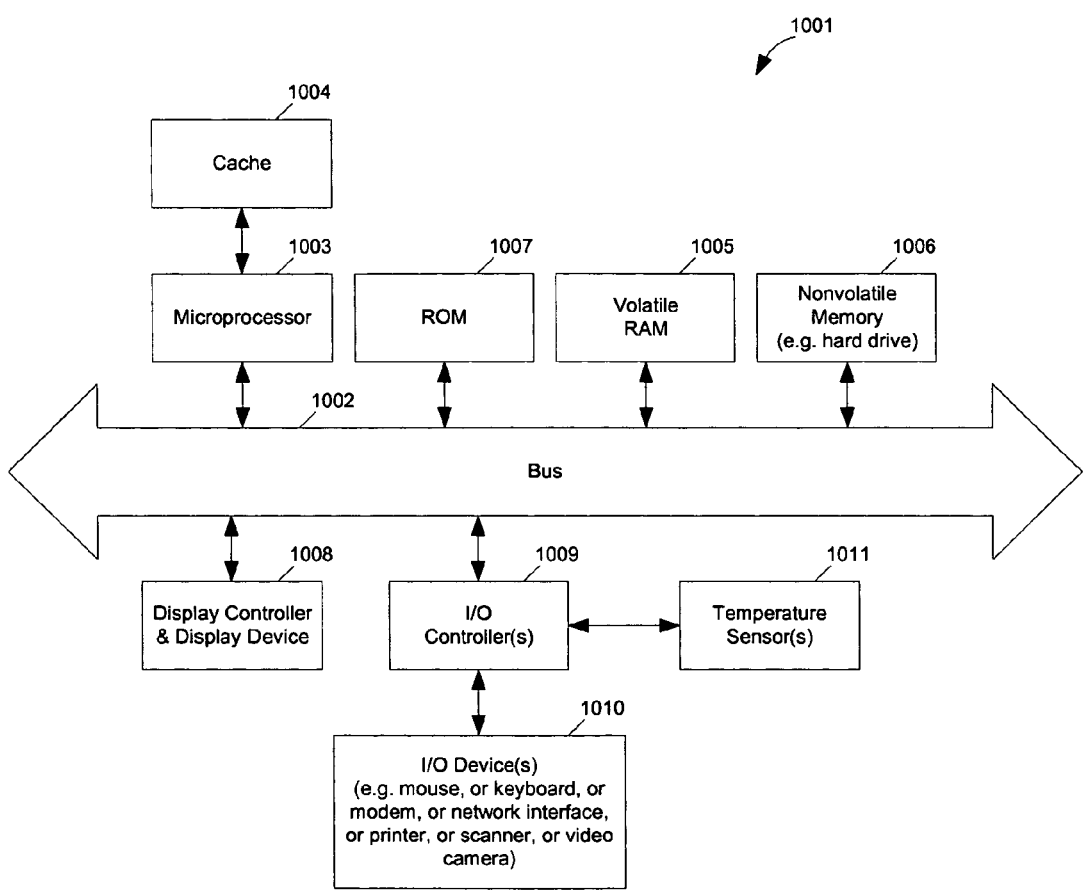
FIG. 10 shows a block diagram example of a data processing system which may be used with the present invention.

FIG. 10 shows one example of a typical computer system which may be used with the present invention. Note that while FIG. 10 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 10 may, for example, be an Apple Macintosh computer.

As shown in FIG. 10, the computer system 1001, which is a form of a data processing system, includes a bus 1002 which is coupled to a microprocessor 1003 and a ROM 1007 and volatile RAM 1005 and a non-volatile memory 1006. The microprocessor 1003, which may be, for example, a G3, G4, or G5 microprocessor from Motorola, Inc. or IBM is coupled to cache memory 1004 as shown in the example of FIG. 10. The bus 1002 interconnects these various components together and also interconnects these components 1003, 1007, 1005, and 1006 to a display controller and display device 1008 and to peripheral devices such as input/output (I/O) devices which may be mice, keyboards, modems, network interfaces, printers, scanners, video cameras and other devices which are well known in the art. Typically, the input/output devices 1010 are coupled to the system through input/output controllers 1009. The volatile RAM 1005 is typically implemented as dynamic RAM (DRAM) which requires power continually in order to refresh or maintain the data in the memory. The non-volatile memory 1006 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 10 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1002 may include one or more buses connected to each other through various bridges, controllers and/or adapters as is well known in the art. In one embodiment the I/O controller 1009 includes a USB (Universal Serial Bus) adapter for controlling USB peripherals, and/or an IEEE-1394 bus adapter for controlling IEEE-1394 peripherals.

In one embodiment of the present invention, at least some of the components can be actively throttled to trade performance for power usage (e.g., without changing functionality). For example, the microprocessor 1003 have different core voltage and frequency settings.

In one embodiment of the present invention, the system 1001 further includes temperature sensor(s) 1011 that are coupled to the I/O controller(s) 1009. The temperature sensor(s) 1011 may include one or more sensors measuring the actual ambient temperature and one or more sensors measuring the actual temperatures of part of the system.

In one embodiment of the present invention, the system 1001 further includes a microcontroller (not show in FIG. 10) which selects settings based on temperature prediction. Alternatively, the microprocessor 1003 may use the sensor measurements to select settings periodically.

In one embodiment of the present invention, the system 1001 further includes one or more fans with adjustable fan speed (not show in FIG. 10), which can be adjusted according to the real-time temperature prediction based on the sensor measurements.

It will be apparent from this description that aspects of the present invention may be embodied, at least in part, in software. That is, the techniques may be carried out in a computer system or other data processing system in response to its processor, such as a microprocessor or a microcontroller, executing sequences of instructions contained in a memory, such as ROM 1007, volatile RAM 1005, non-volatile memory 1006, cache 1004, or other storage devices or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 1003 or a microcontroller.

A machine readable medium can be used to store software and data which when executed by a data processing system causes the system to perform various methods of the present invention. This executable software and data may be stored in various places including for example ROM 1007, volatile RAM 1005, non-volatile memory 1006 and/or cache 1004 as shown in FIG. 10. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.).

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 1001 of FIG. 10.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system, comprising:
   a first sensor positioned at a first location to determine an ambient temperature of an environment in which a component of the data processing system is, wherein the component has an actual temperature at a second location, wherein the first location is away from the second location; and
   a controller coupled to the sensor to predict a future temperature of the component in a subsequent time based, at least in part, on the ambient temperature and the actual temperature of the component at a current time, the controller to account for a heat loss for the component in the subsequent time and on an operating state of the data processing system including at least one of a voltage setting and a frequency setting, the controller configured to control operations of the data processing system that includes adjusting the operating state of the data processing system including adjusting at least one of the voltage setting and the frequency setting of the data processing system based, at least in part, on the future temperature.

2. The system of claim 1, further comprising:
   a second sensor coupled to the controller to determine the actual temperature of the component of the data processing system
   wherein the controller is to control the operations of the data processing system further according to the actual temperature of the component.

3. The system of claim 2, wherein the controller controls the operations of the data processing system based, at least in part, on the future temperature of the component which is a function of the ambient temperature, the actual temperature of the component, and a current operating state of the component.

4. The system of claim 3, wherein the controller selects one from combinations of one or more voltage settings and one or more frequency settings to control operations of the data processing system.

5. The system of claim 4, further comprises:
   a voltage source, the voltage source capable of shifting from a first voltage to a second voltage to change the operating setting of the data processing system without restarting or stopping the data processing system; and
   a frequency source, the frequency source capable of shifting from a first frequency to a second frequency to change the operating setting of the data processing system without restarting or stopping the data processing system.

6. The system of claim 2, wherein the controller is one of:
   a microcontroller; and
   a microprocessor.

7. The system of claim 6, wherein the second sensor is to determine the actual temperature of the component periodically for the controller to determine the operating setting periodically.

8. A data processing system, comprising:
   a plurality of temperature sensors to determine a plurality of actual temperatures and an ambient temperature for the data processing system at a current time; and
   a controller coupled to the plurality of temperature sensors, the controller to select a combination of throttle settings of the data processing system, wherein the combination of the throttle settings includes at least one of a voltage setting and a frequency setting, the controller to predict a temperature of the data processing system in a subsequent time based at least in part, on the plurality of actual temperatures and the ambient temperature at the current time, the controller to account for a heat loss for the data processing system in the subsequent time, and the combination of the throttle settings of the data processing system, the controller to determine if the predicted temperature is allowable for the selected combination of throttle settings, and
   the controller to determine an operating setting of the data processing system including adjusting at least one of the voltage setting and the frequency setting of the data processing system according to the selected combination.

9. The system of claim 8, wherein the prediction of the temperature of the data processing system is based on heat generated from the power consumption according to a worst-case workload for the operating setting.

10. The system of claim 9, wherein the plurality of actual temperatures comprise an actual temperature at a location in the data processing system at a first time instance;
the prediction of the temperature is for the same location at a time period after the first time instance; and the operating setting is determined to limit the predicted temperature under a threshold.

11. The system of claim 10, wherein the plurality of actual temperatures further comprise an actual temperature at a location in the data processing system toward which heat generated from the power consumption dissipates; the time period is shorter than a time constant of the data processing system.

12. The system of claim 8, wherein the controller is one of:
a microcontroller; and
a microprocessor;
wherein the operating setting is for at least one of:
a Central Processing Unit (CPU) microprocessor;
a Graphical Processing Unit (GPU) microprocessor; and
a bus.

13. A machine readable medium storing executable computer program instructions which when executed by a data processing system cause said system to perform a method to control the data processing system, the method comprising:
determining, at a first location, an ambient temperature of an environment in which a component of the data processing system is, wherein the component has an actual temperature at a second location, wherein the first location is away from the second location;
predicting a future temperature of the component in a subsequent time based, at least in part, on the ambient temperature and the actual temperature of the component at a current time, the predicting to account for a heat loss for the component in the subsequent time and based on an operating state of the data processing system including at least one of a voltage setting and a frequency setting, and
controlling operations of the data processing system that includes adjusting the operating state of the data processing system including adjusting at least one of the voltage setting and the frequency setting based, at least in part, on the future temperature.

14. The medium of claim 13, wherein the method further comprises:
determining the actual temperature of the component of the data processing system;
wherein the data processing system is controlled further according to the temperature of the component.

15. The medium of claim 14, wherein said controlling comprises:
selecting one from a plurality of operating settings according to the ambient temperature and the actual temperature of the component.

16. The medium of claim 15, wherein the plurality of operating settings comprise combinations of one or more voltages and one or more frequencies.

17. The medium of claim 16, wherein said controlling further comprises:
shifting from a first voltage to a second voltage according to the one of the plurality of operating settings; and
shifting from a first frequency to a second frequency according to the one of the plurality of operating settings.

18. The medium of claim 15, wherein the one of the plurality of operating settings is selected to limit a predicted temperature of the component under a threshold; wherein the predicted temperature of the component is a function of the ambient temperature, the actual temperature of the component, and the operating setting.

19. The medium of claim 18, wherein determining the actual temperature of the component is performed periodically to perform said selecting periodically.

20. The medium of claim 18, wherein the ambient temperature causes cooling of the component in the function; and the operating setting causes heating of the component in the function.

21. The medium of claim 18, wherein the operating setting determines an upper limit of power consumption; and the predicted temperature of the component is predicted based on the upper limit of the power consumption.

22. The medium of claim 15, wherein the one of the plurality of operating settings comprises a first setting for the component and a second setting for a further component.

23. A machine readable medium storing executable computer program instructions which when executed by a data processing system cause said system to perform a method to control the data processing system, the method comprising:
determining a plurality of actual temperatures and an ambient temperature for the data processing system;
selecting a combination of throttle settings of the data processing system wherein the combination of the throttle settings includes at least one of a voltage setting and a frequency setting;
determining a predicted temperature in a subsequent time based, at least in part, on the plurality of actual temperatures and the ambient temperature at a current time to account for a heat loss for the data processing system in the subsequent time, and the combination of the throttle settings of the data processing system;
determining if the predicted temperature is allowable for the selected combination of throttle settings; and
adjusting an operating setting of the data processing system including adjusting at least one of the voltage setting and the frequency setting according to the selected combination.

24. The medium of claim 23, wherein the operating setting determines an upper limit of power consumption of at least a portion of the data processing system; and the predicted temperature is based on heat generated from the power consumption according to the upper limit.

25. The medium of claim 24, wherein the plurality of actual temperatures comprise actual temperatures at locations in the data processing system at a first time instance; the predicted temperature is for the same location at a time period after the first time instance; and the operating setting is adjusted to limit the predicted temperature under a threshold.

26. The medium of claim 25, wherein the plurality of actual temperatures further comprise an actual temperature at a location in the data processing system toward which heat generated from the power consumption dissipates.

27. The medium of claim 25, wherein the time period is shorter than a time constant of the data processing system.

28. The medium of claim 23, wherein the method further comprises:
determining an allowable amount of power consumption of a heat source for a time period subsequent to the determination of at least one of the actual temperatures, the allowable amount of power consumption to limit the predicted temperature under a threshold;
wherein the operating setting is adjusted according to the allowable amount of power consumption.

29. The medium of claim 23, wherein the operating setting comprises at least one of:
the voltage setting;
the frequency setting;
a spin rate setting; and
a fan speed setting.

30. The medium of claim 23, wherein the operating setting is for at least one of:
a Central Processing Unit (CPU) microprocessor;
a Graphical Processing Unit (GPU) microprocessor;
a bus; and
a disk drive;
of the data processing system.

31. The medium of claim 23, wherein said adjusting the operating setting comprises:
adjusting a voltage source from a first voltage to a second voltage; and
adjusting a frequency source from a first frequency to a second frequency.

32. The medium of claim 31, wherein said adjusting is performed without stopping or restarting the data processing system.

33. A method to control a data processing system, the method comprising:
determining, at a first location, an ambient temperature of an environment in which a component of the data processing system is, wherein the component has an actual temperature at a second location, wherein the first location is away from the second location;
predicting a future temperature of the component in a subsequent time based, at least in part, on the ambient temperature and the actual temperature of the component at a current time, the predicting to account for a heat loss for the component in the subsequent time and based on an operating state of the data processing system including at least one of a voltage setting and a frequency setting, and
controlling operations of the data processing system that includes adjusting the operating state of the data processing system including adjusting at least one of the voltage setting and the frequency setting based, at least in part, on the future temperature.

34. The method of claim 33, further comprising:
determining the actual temperature of the component of the data processing system;
wherein the data processing system is controlled further according to the temperature of the component.

35. The method of claim 34, wherein said controlling comprises:
selecting one from a plurality of operating settings according to the ambient temperature and the actual temperature of the component, wherein the plurality of operating settings comprise combinations of one or more voltages and one or more frequencies;
shifting from a first voltage to a second voltage according to the one of the plurality of operating settings; and
shifting from a first frequency to a second frequency according to the one of the plurality of operating settings.

36. The method of claim 35, wherein the one of the plurality of operating settings is selected to limit a predicted temperature of the component under a threshold; wherein the predicted temperature of the component is a function of the ambient temperature, the actual temperature of the component, and the operating setting.

37. The method of claim 36, wherein determining the actual temperature of the component is performed periodically to perform said selecting periodically; the ambient temperature causes cooling of the component in the function; and the operating setting causes heating of the component in the function.

38. A method to control a data processing system, the method comprising:
determining a plurality of actual temperatures and an ambient temperature for the data processing system;
selecting a combination of throttle settings of the data processing system wherein the combination of the throttle settings includes at least one of a voltage setting and a frequency setting;
determining a predicted temperature in a subsequent time based, at least in part, on the plurality of actual temperatures and the ambient temperature at a current time to account for a heat loss for the data processing system in the subsequent time, and the combination of the throttle settings of the data processing system;
determining if the predicted temperature is allowable for the selected combination of throttle settings; and
adjusting the operating setting of the data processing system including adjusting at least one of the voltage setting and the frequency setting according to the selected combination.

39. The method of claim 38, wherein the operating setting determines an upper limit of power consumption of at least a portion of the data processing system; the predicted temperature is based on heat generated from the power consumption according to the upper limit; the plurality of actual temperatures comprises an actual temperature at a location in the data processing system at a first time instance; the predicted temperature is for the same location at a time period after the first time instance; and the operating setting is adjusted to limit the predicted temperature under a threshold.

40. The method of claim 39, wherein the plurality of actual temperatures further comprise an actual temperature at a location in the data processing system toward which heat generated from the power consumption dissipates; and the time period is shorter than a time constant of the data processing system.

41. The method of claim 38, wherein said adjusting is performed without stopping or restarting the data processing system.

42. A data processing system, comprising:
means for determining, at a first location, an ambient temperature of an environment in which a component of the data processing system is, wherein the component has an actual temperature at a second location, wherein the first location is away from the second location;
means for predicting a future temperature of the component in a subsequent time based, at least in part, on the ambient temperature and the actual temperature of the component at a current time to account for a heat loss for the component in the subsequent time and on an operating state of the data processing system including at least one of a voltage setting and a frequency setting; and
means for controlling operations of the data processing system that includes means for adjusting the operating state of the data processing system including adjusting at least one of the voltage setting and the frequency setting based, at least in part, on the future temperature.

43. The data processing system of claim 42, further comprising:
means for determining an actual temperature of a component of the data processing system;
wherein the data processing system is controlled further according to the temperature of the component.

44. The data processing system of claim 43, wherein said means for controlling comprises:

means for selecting one from a plurality of operating settings according to the ambient temperature and the actual temperature of the component, wherein the plurality of operating settings comprise combinations of one or more voltages and one or more frequencies;

means for shifting from a first voltage to a second voltage according to the one of the plurality of operating settings; and means for shifting from a first frequency to a second frequency according to the one of the plurality of operating settings.

45. The data processing system of claim 44, wherein the one of the plurality of operating settings is selected to limit a predicted temperature of the component under a threshold; wherein the predicted temperature of the component is a function of the ambient temperature, the actual temperature of the component, and the operating setting.

46. A data processing system, comprising:

means for determining, at a first location, a plurality of actual temperatures and an ambient temperature for the data processing system determined at a second location, wherein the first location is away from the second location; and means for adjusting an operating setting of the data processing system including adjusting at least one of a voltage setting and a frequency setting according to a predicted temperature in a subsequent time which is determined based, at least in part, on the plurality of actual temperatures and the ambient temperature at a current time to account for a heat loss for the data processing system in the subsequent time, and a combination of the throttle settings of the data processing system wherein the combination of the throttle settings includes at least one of the voltage setting and the frequency setting.

47. The data processing system of claim 46, wherein the operating setting determines an upper limit of power consumption of at least a portion of the data processing system; the predicted temperature is based on heat generated from the power consumption according to the upper limit; the plurality of actual temperature comprises an actual temperature at a location in the data processing system at a first time instance; the predicted temperature is for the same location at a time period after the first time instance; and the operating setting is adjusted to limit the predicted temperature under a threshold.

48. The data processing system of claim 47, wherein the plurality of actual temperatures further comprise an actual temperature at a location in the data processing system toward which heat generated from the power consumption dissipates; and the time period is shorter than a time constant of the data processing system.

49. The data processing system of claim 46, wherein said means for adjusting adjusts without stopping or restarting the data processing system.

50. A method of operating a data processing system, the method comprising:

predicting an operating temperature, of the data processing system, at a future time based at least in part, on an actual temperature of a component of the data processing system and an ambient temperature of the data processing system at a current time to account for a heat loss for the component in the subsequent time and on an operating state of the data processing system including at least one of a voltage setting and a frequency setting, wherein the ambient temperature is determined at a first location, the actual temperature is determined at a second location, wherein the first location is away from the second location; and setting the operating setting of at least one component of the data processing system including adjusting at least one of the voltage setting and the frequency setting based on, at least in part, the operating temperature, which was predicted.

51. The method of claim 50, wherein the operating setting is set for the time period up to the future time; and said predicting and said setting are performed in a periodic way.

52. The method of claim 51, wherein the operating temperature is predicted based on a measurement of at least one current temperature.

53. The method of claim 52, wherein the at least one current temperature comprises:

an ambient temperature; and a temperature of a component of the data processing system.

54. A machine readable medium storing executable computer program instructions which when executed by a data processing system cause said system to perform a method of operating a data processing system, the method comprising:

predicting an operating temperature, of the data processing system, at a future time based at least in part, on an actual temperature of a component of the data processing system and an ambient temperature of the data processing system at a current time to account for a heat loss in the future time and on an operating state of the data processing system including at least one of a voltage setting and a frequency setting, wherein the ambient temperature is determined at a first location, the actual temperature is determined at a second location, wherein the first location is away from the second location; and setting the operating setting of at least one component of the data processing system including adjusting at least one of the voltage setting and the frequency setting based on, at least in part, the operating temperature, which was predicted.

55. The medium of claim 54, wherein the operating setting is for the time period up to the future time; and the time period is in an order no larger than a thermal time constant of the data processing system.

56. The medium of claim 54, wherein the operating temperature is predicted based on a measurement of a current ambient temperature and a measurement of a current temperature of a component of the data processing system.

57. The medium of claim 54, wherein the operating setting is set to limit the operating temperature below a temperature threshold.

* * * * *